July 29, 1952  D. M. MORGENSTERN  2,604,818
REARVIEW MIRROR ASSEMBLY
Filed May 27, 1950
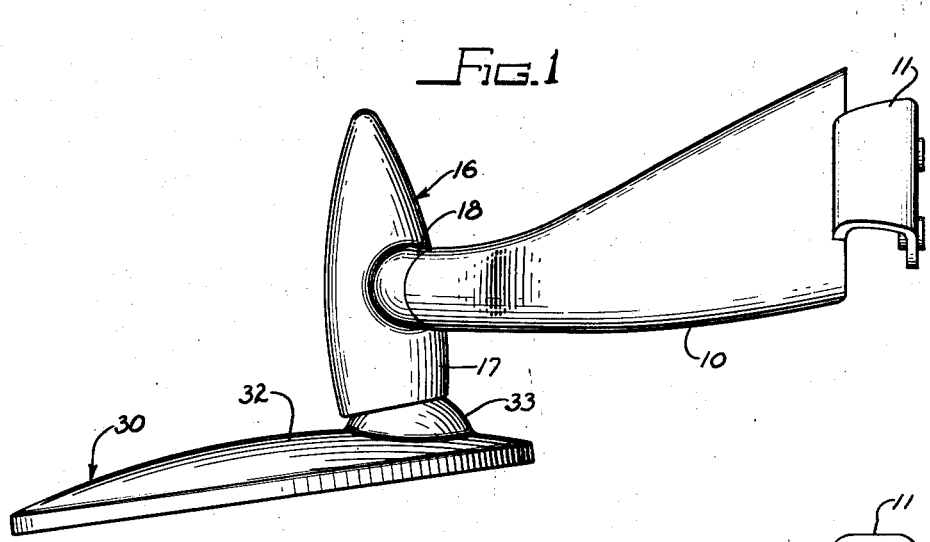
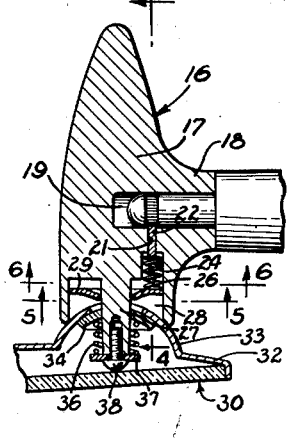
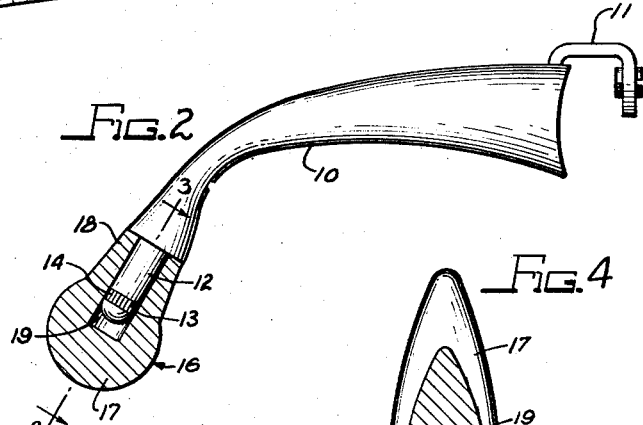
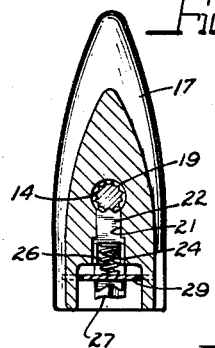
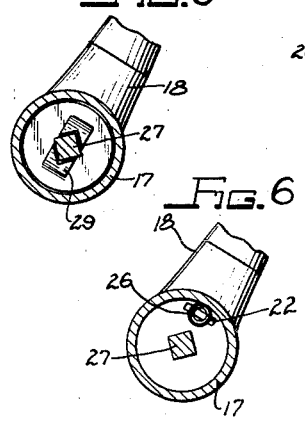
Inventor
David M. Morgenstern
by: *[signature]*  Atty.

Patented July 29, 1952

2,604,818

UNITED STATES PATENT OFFICE 2,604,818

REARVIEW MIRROR ASSEMBLY

David M. Morgenstern, Cleveland, Ohio, assignor to Nelmor Corporation, Cleveland, Ohio, a corporation of Illinois Application May 27, 1950, Serial No. 164,826

3 Claims. (Cl. 88—98)

My invention relates to improvements in mirror assemblies, and more particularly to a universally adjustable mirror support for use with rear view mirrors of automotive vehicles and the like.

One of the objects of my invention is the provision of a rear view mirror support so constructed that the mirror may be adjusted to any desired position relative to the supporting means and firmly held in its adjusted position.

Another object of my invention is the provision of a rear view mirror support of the foregoing type which is simple in construction, economical to manufacture and highly efficient in use.

Other and further objects and advantages of my invention will become apparent from the following description when considered in connection with the accompanying drawings, in which—

Fig. 1 is a top plan view illustrating my invention.

Fig. 2 is a side elevational view with the swivel joint shown in section.

Fig. 3 is a cross-sectional view taken substantially on line 3—3 of Fig. 2.

Fig. 4 is a cross-sectional view taken substantially on line 4—4 of Fig. 3.

Fig. 5 is a cross-sectional view taken substantially on line 5—5 of Fig. 3.

Fig. 6 is a cross-sectional view taken substantially on line 6—6 of Fig. 3, and

Fig. 7 is a perspective view of a detail of construction.

Referring to the drawings, the numeral 10 indicates an arm which may be shaped substantially as shown in Figs. 1 and 2, the said arm being provided at its free end with a clamping element 11 by which the arm may be fastened to the upper flange of a door of an automotive vehicle. It will be understood, however, that the arm and clamp may be of any suitable form and type and may be adapted for attachment to any other part of a vehicle. The opposite end of the arm 10 is provided with a reduced integral extension 12 which is of cylindrical form and near the end of which is provided an annular recess 13, the bottom surface of said recess being formed with a series of serrations 14. The end of the extension 12 is preferably rounded, as illustrated in Fig. 2, to facilitate assembly of the arm with the other parts, hereinafter to be described.

A connecting element, indicated generally by the numeral 16, and commonly known in the trade as a torpedo, includes an elongated body portion 17 having a lateral extension 18, the said extension being provided with a bore 19 in which is received the extension 12. The member 16 is preferably formed by die casting and is provided with a bore 21, rectangular in cross-section, in which is received a pawl 22, shown more clearly in Fig. 7. The pawl 22 is provided with a plurality of teeth 23 which are adapted to engage with the serrations 14 on the extension 12 to effect locking of the member 16 relative to the arm 10. The pawl 22 serves the additional function of securing the arm 10 and torpedo 16 in assembled relation, yet permitting relative swivel movement. Communicating with the bore 21 is a cylindrical bore 24 in which is accommodated a spring 26 which bears against the pawl 22 to urge the same into engagement with the serrations 14. The central member 27 of the body 17, which is preferably square in cross-section, is extended beyond the end of the said body, as illustrated in Fig. 3, and is surrounded by an annular recess 28 which communicates with the bore 24. A speed nut 29 of conventional type, such as manufactured by the Tinnerman Company of Cleveland, Ohio, is received on the extension member 28 and is adapted to engage the spring 26 to retain the same in compressed condition. The annular recess 28 serves as a ball socket to receive the mirror assembly 30, hereinafter described, the marginal edges of the recess being suitably bevelled for that purpose.

The mirror assembly 30 is associated with the torpedo 16 through a substantially universal pivot connection which is disposed eccentrically at the rear of the mirror. The universal connection is achieved by forming on the mirror backing 32 a substantially semi-spherical portion 33 which is adapted to engage into the annular recess 28. A dished washer 34 positioned on the extension member 27 is caused to bear against the inside face of the semi-spherical portion 33 by a spring 36 which is retained under compression by a washer 37 and bolt 38 threaded into the end of the extension member 27. It will be seen that the eccentric disposition of the mirror makes it possible to adjust the same to various positions relative to the support and thus to cover a wide field of vision.

It will be apparent that the mirror assembly 30 and torpedo 16 may be turned in either direction to any position within a 360° circle relative to the supporting arm 10, thereby providing for a wide range of adjustment for the mirror. It will also be apparent that the spring biased pawl 22 will exert sufficient pressure against the serrations 14 to retain the member 16 and the mirror assembly securely in a position of adjustment and against inadvertent displacement which may be occasioned through vibration or wind resistance. However, when it is desired to effect an adjustment of the mirror, the resistance of the spring 26 on the pawl 22 may be easily overcome.

The ratchet feature above described is particularly advantageous under certain conditions of accidental collision with another body. The swivel ratchet connection between the torpedo and the arm permits the mirror assembly to turn about the axis of the extension member 12 so as to deflect a blow and avoid injury thereto. Because of the universal action of the mirror supporting means, it will be apparent that the mirror lends itself to installation in a variety of positions, such that a single construction may be employed either for installation on the right and left hand sides of a vehicle, since the torpedo 16 may be turned so that the mirror is in a reversed position from that illustrated in the drawings.

I claim:

1. Supporting means for rear view mirror and the like comprising an arm adapted for attachment to a vehicle, said arm having an end portion cylindrical in form, said end portion having an annular groove and serrations in the bottom of said groove, a socketed member having a generally cylindrical socket for receiving said end portion, said socketed member having a slideway disposed perpendicular to the axis of said socket, a pawl member slideable in said slideway and having at least one tooth at the end thereof received in said groove and engageable with the serrations therein, spring means bearing on said pawl member and normally urging the same into said groove so as to permit rotary adjustment of the socketed member relative to the arm but preventing displacement axially of said socket, and a mirror assembly having a ball portion swivelly seated on said socketed member.

2. The invention as defined in claim 1 wherein the axis of the socket is disposed perpendicularly to the axis of the socketed member.

3. Supporting means for rear view mirror and the like comprising an arm adapted for attachment to a vehicle, said arm having an end portion cylindrical in form, said end portion having an annular groove and serrations in the bottom of said groove, a socketed member having a generally cylindrical socket for receiving said end portion, said socketed member having a slideway disposed perpendicular to the axis of said socket, a pawl member slideable in said slideway and having at least one tooth at the end thereof received in said groove and engageable with the serrations therein, spring means bearing on said pawl member and normally urging the same into said groove so as to permit rotary adjustment of the socketed member relative to the arm but preventing displacement axially of said socket, and a mirror assembly having a ball and socket mounting carried on said socketed member with its axis of movement substantially at a right angle to the axis of said socket.

DAVID M. MORGENSTERN.

REFERENCES CITED

The following references are of record in the file of this patent:

UNITED STATES PATENTS

| Number | Name | Date |
|---|---|---|
| 423,434 | Lotto | Mar. 18, 1890 |
| 704,497 | Banks | July 15, 1902 |
| 1,435,310 | Kipper | Nov. 14, 1922 |
| 2,333,671 | Peters | Nov. 9, 1943 |
| 2,411,421 | Golden | Nov. 19, 1946 |
| 2,452,316 | Moreley | Oct. 26, 1948 |
| 2,533,475 | Koonter | Dec. 12, 1950 |
| 2,534,495 | Younghusband | Dec. 19, 1950 |